(12) United States Patent
Janampally et al.

(10) Patent No.: US 12,429,134 B2
(45) Date of Patent: Sep. 30, 2025

(54) TRANSMISSION SYSTEM AND SHIFTING METHOD (71) Applicant: Dana Heavy Vehicle Systems Group, LLC, Maumee, OH (US)

(72) Inventors: Sandeep Janampally, Perrysburg, OH (US); Mohammed Yasin, Canton, MI (US); James Allen, Atherstone (GB)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 199 days.

(21) Appl. No.: 18/483,206

(22) Filed: Oct. 9, 2023

(65) Prior Publication Data

US 2025/0116329 A1   Apr. 10, 2025

(51) Int. Cl.
| | |
|---|---|
| F16H 61/32 | (2006.01) |
| B60L 58/12 | (2019.01) |
| F16H 59/50 | (2006.01) |
| F16H 59/62 | (2006.01) |
| F16H 59/64 | (2006.01) |
| F16H 59/66 | (2006.01) |
| F16H 61/68 | (2006.01) |

(52) U.S. Cl.
CPC .............. *F16H 61/32* (2013.01); *B60L 58/12* (2019.02); *F16H 59/50* (2013.01); *F16H 59/62* (2013.01); *F16H 59/64* (2013.01); *F16H 59/66* (2013.01); *F16H 61/68* (2013.01); *B60L 2240/62* (2013.01); *B60L 2240/642* (2013.01); *B60L 2240/66* (2013.01); *B60L 2240/662* (2013.01); *F16H 2059/663* (2013.01); *F16H 2200/0021* (2013.01)

(58) Field of Classification Search
None
See application file for complete search history.

(56) References Cited

U.S. PATENT DOCUMENTS

| | | | |
|---|---|---|---|
| 8,255,133 B2 * | 8/2012 | Ahn ..................... | F16H 61/12 |
| | | | 701/64 |
| 8,556,772 B2 * | 10/2013 | Biallas .................. | F16H 61/16 |
| | | | 477/115 |
| 8,880,256 B2 | 11/2014 | Heap et al. | |
| 10,281,030 B2 * | 5/2019 | Maurer ................ | F16H 59/18 |
| 10,967,848 B2 | 4/2021 | Ruybal et al. | |

* cited by examiner

*Primary Examiner* — Todd Melton
(74) *Attorney, Agent, or Firm* — McCoy Russell LLP (57) ABSTRACT

Systems and methods for a transmission. The transmission system operating method includes, in one example, re-estimating a time for each phase of an alternate gear shift in response to determining one or more conditions that are indicative of an operator's intent to implement the alternate gear shift. The method further includes performing one or more gear change phases that reduce a duration to implement the alternate gear shift based on the re-estimated time for each phase of the alternate gear shift.

20 Claims, 5 Drawing Sheets

TRANSMISSION SYSTEM AND SHIFTING METHOD

TECHNICAL FIELD

The present disclosure relates to a transmission system and a shifting method for the transmission system which reduces shift time.

BACKGROUND AND SUMMARY

Transmissions are used in vehicles to provide a speed/torque adjustment of the output of a prime mover, such as an internal combustion engine (ICE) or an electric motor. Transmissions are designed with discrete gear ratios that can be selected by a vehicle operator to initiate a shift.

U.S. Pat. No. 8,880,256 B2 to Heap et al. discloses a transmission control method that stabilizes selection between multiple gear ranges when a change of mind is detected. The strategy disclosed by Heap permits the change of mind shift event to take place solely when the energy usage of changing to the selected gear is low from an efficiency perspective.

The inventors have recognized several drawbacks with the transmission operating method disclosed in Heap as well as other previous transmission control techniques. For instance, Heap's transmission as well as other previous transmissions may experience an undesirable increase in shift duration when a new gear is selected by an operator during a shifting transient, in some instances. Increasing the duration of the shifting transient due to the operator changing a targeted gear during an ongoing shift event decreases shifting performance and customer appeal.

Facing the abovementioned issues, the inventors developed a method for operation of a transmission system. The method includes, in one example, re-estimating a time for each phase of an alternate gear shift in response to determining one or more conditions that are indicative of an operator's intent to implement an alternate gear shift. In such an example, the method further includes performing one or more gear change phases that reduce a duration to implement the alternate gear shift based on the re-estimated time for each phase of the alternate gear shift. In this way, the duration of the shifting event is decreased when a change of mind condition (signifying an operator's intent to alter the current shift event) is present. Consequently, shifting performance is increased, thereby increasing customer satisfaction.

Still further in one example, the time for each phase may be re-estimated based on a voltage of a lower voltage energy storage device. In such an example, the lower voltage energy storage device may be electrically coupled to multiple clutch actuators in the transmission. Still further, in one example, the time for each phase may be re-estimated based on a state of charge of a higher voltage battery and the higher voltage battery may be electrically coupled to a traction motor. In this way, the estimated time of the phases involved in the alternate shift event may be accurately determined, thereby increasing the confidence in selecting the shorter (e.g., the shortest) duration shift scheme.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
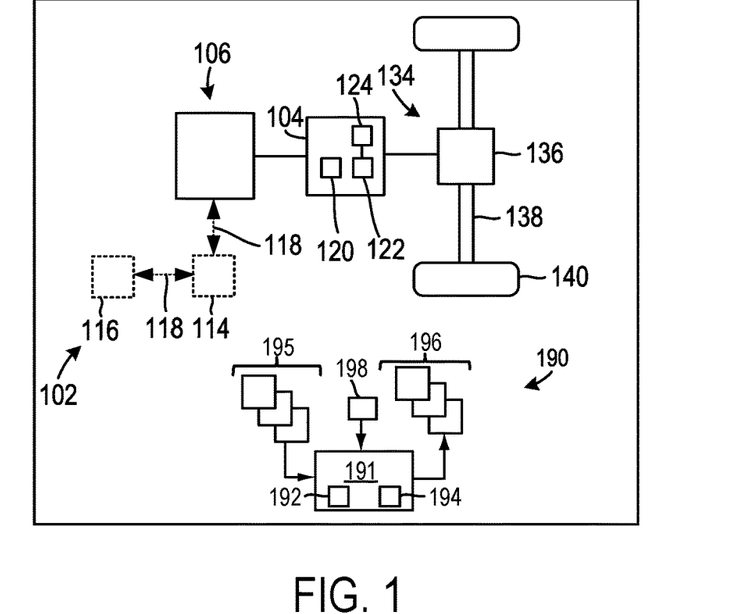
FIG. 1 shows a schematic depiction of a transmission system in a vehicle.

FIG. 1 shows a schematic illustration of a vehicle 100. The vehicle may be a passenger vehicle, a commercial vehicle, an on-highway vehicle, or an off-highway vehicle, in different examples.

In the vehicle example, the vehicle 100 includes a powertrain 102 with a transmission 104 (e.g., gearbox) and a prime mover 106. The prime mover may be an internal combustion engine, in one example. However, in another example, the prime mover may be a traction motor.

When the prime mover is a traction motor, the motor may be included in an electric drive system. In such an example, the vehicle is an electric vehicle. In the electric drive example, power may flow from the transmission to the electric motor while the motor is operated as a generator, during certain conditions. In the electric vehicle (EV) example, the EV may be an all-electric vehicle (e.g., a battery electric vehicle (BEV)), in one example, or a hybrid electric vehicle (HEV) with an internal combustion engine, in another example.

When the prime mover is a traction motor, the motor may be a multi-phase alternating current (AC) machine, in one specific example. However, in other examples, the traction motor may be a direct current (DC) machine. In the AC machine example, the traction motor may be electrically coupled to an inverter 114. The inverter 114 is designed to convert DC power to AC power and vice versa. However, in other examples, the traction motor may be a DC electric motor (as previously indicated) and the inverter 114 may therefore be omitted from the vehicle 100. The inverter 114 may receive electric energy from one or more energy storage device(s) 116 (e.g., traction batteries, capacitors, combinations thereof, and the like). The energy storage device(s) 116 may be referred to as a higher voltage energy storage device 116, in comparison to the lower voltage energy storage device 124, discussed in greater detail herein. Arrows 118 signify the electric energy transfer between the traction motor 106, the inverter 114, and the energy storage device(s) 116 that may occur during different modes of system operation.

The transmission 104 includes selectable gears 120 and clutches 122 that allow the transmission to shift between the selectable gears. To elaborate, the clutches may be friction clutches, in one example. However, in other examples, the clutches may be dog clutches, synchronizers, combinations thereof, and the like. The clutches may be hydraulically, pneumatically, and/or electro-mechanically actuated. The transmission 104 may further include shafts, bearings, and the like which enable the transmission to shift between active gears. Further, the transmission 104 may be an automatic transmission which is configured to automatically shift between discrete gears based on vehicle speed and load as well as allow an operator to change the active gear in the transmission based on interaction with a gear selector which has discrete positions that correlated to the selectable gears in the transmission (e.g., reverse gear, first forward gear, second forward gear, etc.). Thus, the transmission may be a semi-automatic transmission (e.g., a step shift transmission) or a fully automatic transmission.

The lower voltage energy storage device 124 (e.g., lower voltage battery) may be electrically coupled to the actuators of the clutches to facilitate engagement and disengagement of each of the clutches. The lower voltage energy storage device 124 is included in the transmission 104 in the illustrated example. However, the lower voltage energy storage device 124 may be included in other suitable vehicle locations, in alternate examples.

Further, the transmission 104 is mechanically coupled to a drive axle assembly 134 to enable torque transfer therebetween. The axle assembly 134 may include a differential 136, axle shafts 138, and/or drive wheels 140, in the illustrated example. In some examples, the transmission may be coupled to another drive axle assembly to provide all-wheel drive capabilities.

The vehicle 100 may further include a control system 190 with a controller 191 (e.g., a transmission control unit (TCU)), as shown in FIG. 1. The controller 191 may include a microcomputer with components such as a processor 192 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions that are executable by the processor for performing the methods and control techniques described herein as well as other variants that are anticipated but not specifically listed. As such, the control techniques, schemes, methods, and the like expanded upon herein may be stored as instructions in non-transitory memory.

The controller 191 may receive various signals from sensors 195 coupled to various regions of the vehicle 100. For example, the sensors 195 may include a pedal position sensor designed to detect a depression of an operator-actuated pedal such as an accelerator pedal and/or a brake pedal, a gear selector sensor, clutch position sensors, speed sensor(s) at the transmission input and/or output shaft, a motor speed sensor, an ambient temperature sensor, an ambient pressure sensor, and the like. The clutch position sensors may be coupled to the clutches which each provide a signal indicative of clutch state (e.g., engaged or disengaged).

An input device 198 (e.g., accelerator pedal, brake pedal, drive mode selector, gear selector, combinations thereof, and the like) may further provide input signals indicative of an operator's intent for system control. To elaborate, the input device may include a gear selector that allows an operator to select an active operating gear for the transmission. For instance, in one use case example, the input device may have discrete position for the discrete number of transmission gears (e.g., a five or four gear configuration). In such an example, the operator is able to interact with the input device to place the device in one of the discrete positions. As such, the input device may send a signal to the controller which indicates an operator's intent for the transmission's current operating gear.

Upon receiving the signals from the various sensors 195 of FIG. 1, the controller 191 processes the received signals, and employs various actuators 196 of system components to adjust the components based on the received signals and instructions stored on the memory of controller 191. For example, the controller 191 may adjust the speed of the traction motor 106 via adjustment of the inverter 114, for instance. For instance, the controller 191 may determine that the electric machine's speed should be adjusted and responsive to such a determination the controller may send a command to the inverter to adjust electric machine speed. The other controllable components in the system may function in a similar manner with regard to sensor signals, control commands, and actuator adjustment, for example.

Figure 2:
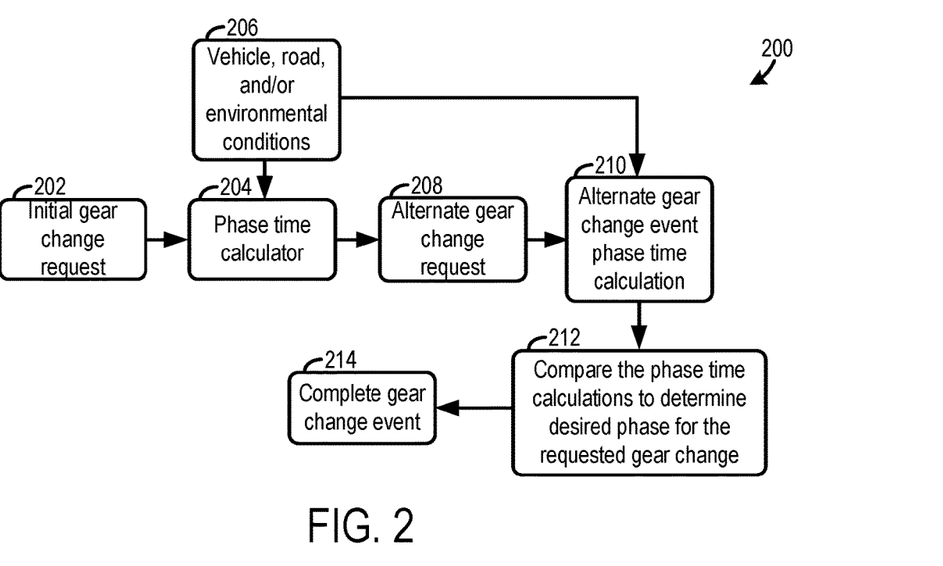
FIG. 2 shows a control scheme for a change of mind shift scenario.

FIG. 2 shows a transmission system control scheme 200 during a shift change of mind event. A change of mind event as described herein is a transmission operating event where an alternate gear change request is received by a controller through operator interaction with a gear selector and/or other suitable input device during a shifting transient. As such, the initial gear change may be automatically triggered by the transmission controller or may be triggered via operator interaction with the gear selector. The control scheme 200 as well as the other control schemes, control techniques, methods, etc. described herein may be implemented via the transmission, control system, and/or other vehicle components shown in FIG. 1. However, in other examples, the control scheme and/or the other control techniques, methods, etc. described herein may be implemented by other suitable transmissions, control systems, and the like.

At 202, the control scheme includes receiving an initial gear change request. For instance, the gear change request may be automatically generated by the TCU or the gear change request may be generated in response to operator interaction with a gear selector. To elaborate, a vehicle operator may move a gear selector into a discrete position corresponding to an active gear for the transmission.

At 204, the control scheme includes determining a phase time for each phase associated with a gear shift event corresponding to the gear change request. The gear shift event may include five phases. In one example, the first phase may be a torque roll off phase where actions are taken to decrease the torque output of the prime mover (e.g., the traction motor) to remove load from the transmission's current active gear. For instance, in one use-case example, a control command may be sent to an inverter to decrease traction motor torque. Continuing with this example, the second phase may be a clutch disengagement phase where actions are taken to disengage the transmission's current active gear by disengaging the outgoing clutch. For instance, a clutch actuator may be operated to disengage the clutch. In one specific use-case example, the pressure supplied to a clutch piston may be decreased to disengage the clutch. The third phase may be a speed synchronization phase where actions are taken to speed synchronize the incoming gear. To elaborate, the speed of a shaft with the incoming gear may be adjusted to match the speed of the outgoing gear. The fourth phase may include implementing actions to engage the incoming gear such as engaging the incoming clutch. The fifth phase may include actions taken to increase the output torque of the prime mover to return to an operator demanded torque. For instance, a control command may be sent to an inverter to increase traction motor torque. The phase time calculation for each phase may take into account the voltage, current, temperature, and hydraulic line pressure desired for clutch engagement and disengagement. Further, in one example, the phase time calculation for each step may use the clutch actuator's proportional integral derivative (PID) control scheme as the phase time values may be fixed for certain operating conditions. Clutch speed synchronization based on upshift or downshift and available traction torque or regenerative torque values may be used to determine the phase time values. The available traction torque may be calculated using battery state of charge, battery voltage, motor temperature, inverter temperature, and/or a degradation mode. Regeneration torque may be used when an upshift occurs due to the motor speed reduction that occurs during the upshift. When regeneration torque is generated the traction battery may be charged. Conversely, when a downshift occurs, motor speed may be increased such that traction torque is demanded, thereby decreasing traction battery charge. The shift phases are expanded upon herein with regard to FIG. 3.

The phase time calculation step at 204 may be implemented based on vehicle, road, and/or environmental conditions which are determined at step 206. To elaborate, the vehicle conditions may include a higher voltage energy storage device state of charge (e.g., traction battery state of charge) and/or a lower voltage energy storage device state of charge. The lower voltage energy storage device may be used for moving the clutch actuators (e.g., clutch actuation motors). The road conditions may include vehicle location (e.g., vehicle global position system (GPS) coordinates) and/or road grade. The environmental conditions may include ambient temperature and/or ambient pressure. These environmental conditions have an influence on the shift duration as the supply voltage is dependent on and impacts motor performance, transmission performance, and powertrain operating conditions such as transmission oil temperature and the like.

At 208, the control scheme includes receiving an alternate gear change request. For example, the operator may move the gear selector to an alternate position which corresponds to another active transmission gear.

At 210, the control scheme includes determining an alternate gear change event phase time calculation for the phases corresponding to the alternate gear shift event. Step 210 may use the vehicle, road, and/or environmental conditions determined at step 206.

At 212, the control scheme includes comparing the phase time calculations for the initial gear change event and the alternate gear change event. At 214 the control scheme includes completing the gear change event based on the comparison between the phase time calculations to decrease (e.g., minimize) the duration of the gear change event.

In one specific use-case example, the initial gear change event may be a shift from a second gear to a first gear and the alternate gear change event may be a shift back to the second gear during a high state of charge condition of the traction battery. In such an example, the speed synchronization phase on the upshift from the first gear to the second gear may be longer since regeneration cannot be used very much. Therefore, completing the shift from the second gear to the first gear speed synchronization uses some of the traction battery's state of charge and subsequently when shifting from the first gear back to the second gear immediately, it would be quicker. However, during a lower traction battery state of charge condition, it would be time efficient to discontinue the speed synchronization phase during the shift from the second gear to the first gear and synchronize the transmission back to the second gear.

Figure 3:
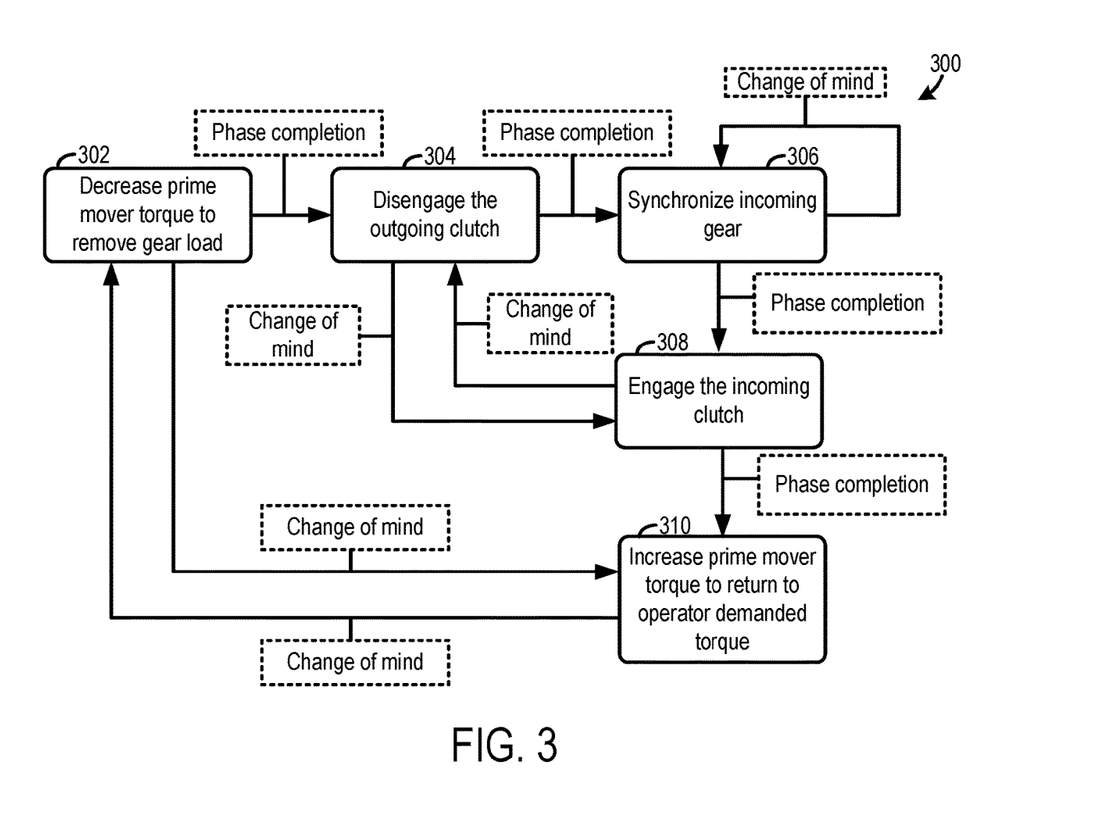
FIG. 3 shows a control scheme for a multi-phase shift event.

FIG. 3 shows a transmission system control scheme 300 where the five phases for a shift event are depicted along with scenarios for phase completion or change of mind event are illustrated.

At 302, the control scheme includes decreasing prime mover torque to remove gear load. For instance, the electric power supplied to a traction motor from an inverter or other suitable energy source may be decreased. At 304, the control scheme includes disengaging the outgoing clutch. For instance, an electro-mechanical actuator may be commanded to disengage the outgoing clutch. It will be appreciated, that during a shift event one clutch is engaged and conversely another clutch is disengaged.

At 306, the control scheme includes synchronizing the incoming gear. For instance, the shaft on which the incoming gear is positioned may be speed adjusted to match the input speed for the incoming clutch. At 308, the control scheme includes engaging the incoming clutch. For instance, the clutch may be hydraulically and/or electro-mechanically engaged.

At 310, the control scheme includes increasing prime mover torque to return to operator demanded torque. For example, the electrical energy delivered to the traction motor may be increased.

Step 302 may be referred to as a first phase, step 304 may be referred to as a second phase, step 306 may be referred to as a third phase, step 308 may be referred to as a fourth phase, and step 310 may be referred to as a fifth phase.

When a shift change of mind event does not occur the first through the fifth phases are sequentially implemented after the completion of each phase. However, during a change of mind event, the shift event may jump from phase one to phase five or vice versa, the shift event may jump from phase two to phase four or vice versa, or the third phase may be repeated as shown in FIG. 3. These change of mind events therefore alter the phase sequence to more quickly arrive at the alternate gear selected by the operator.

Figure 4A:
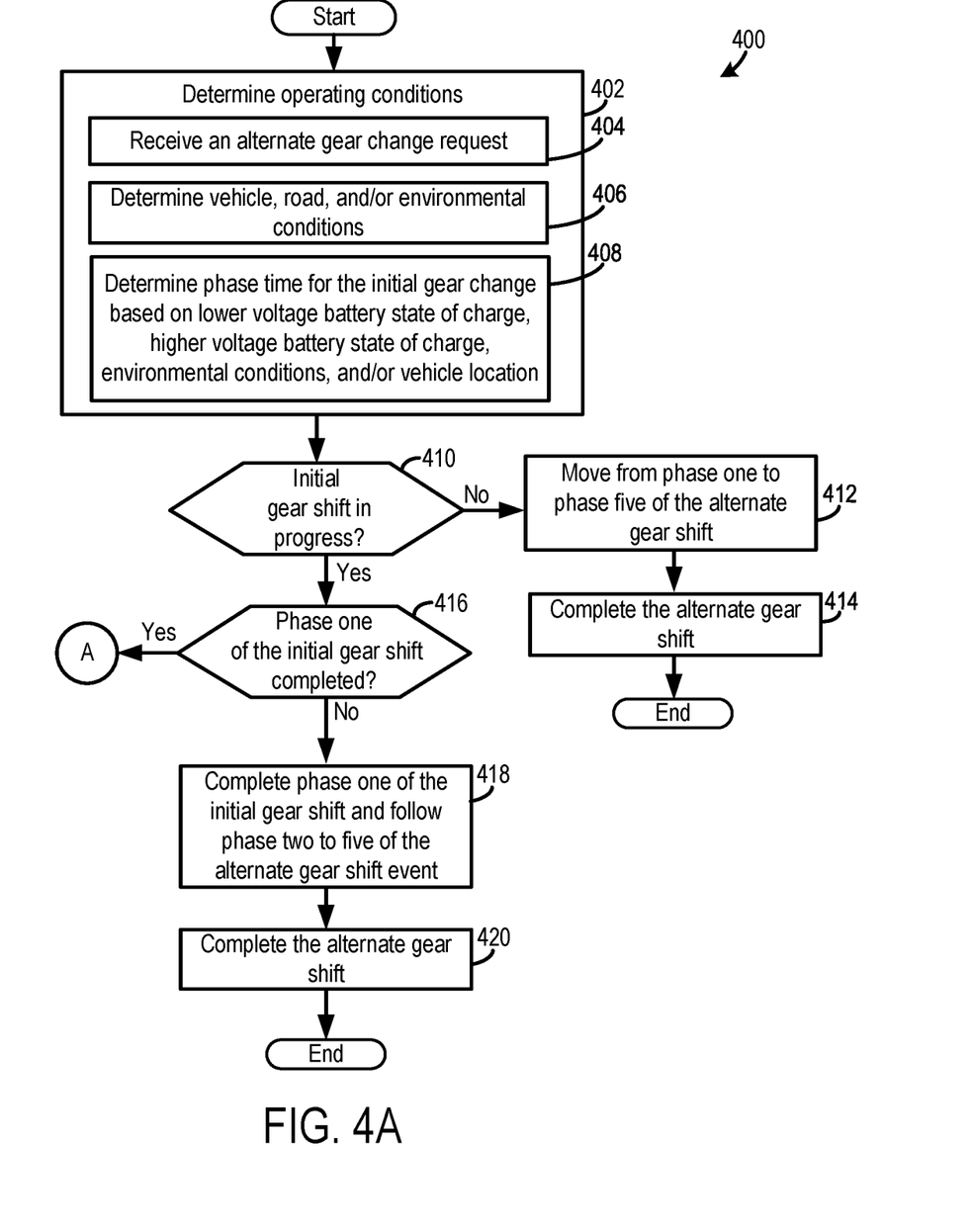
FIGS. 4A-4C show a method for operation of a transmission system.
Figure 4B:
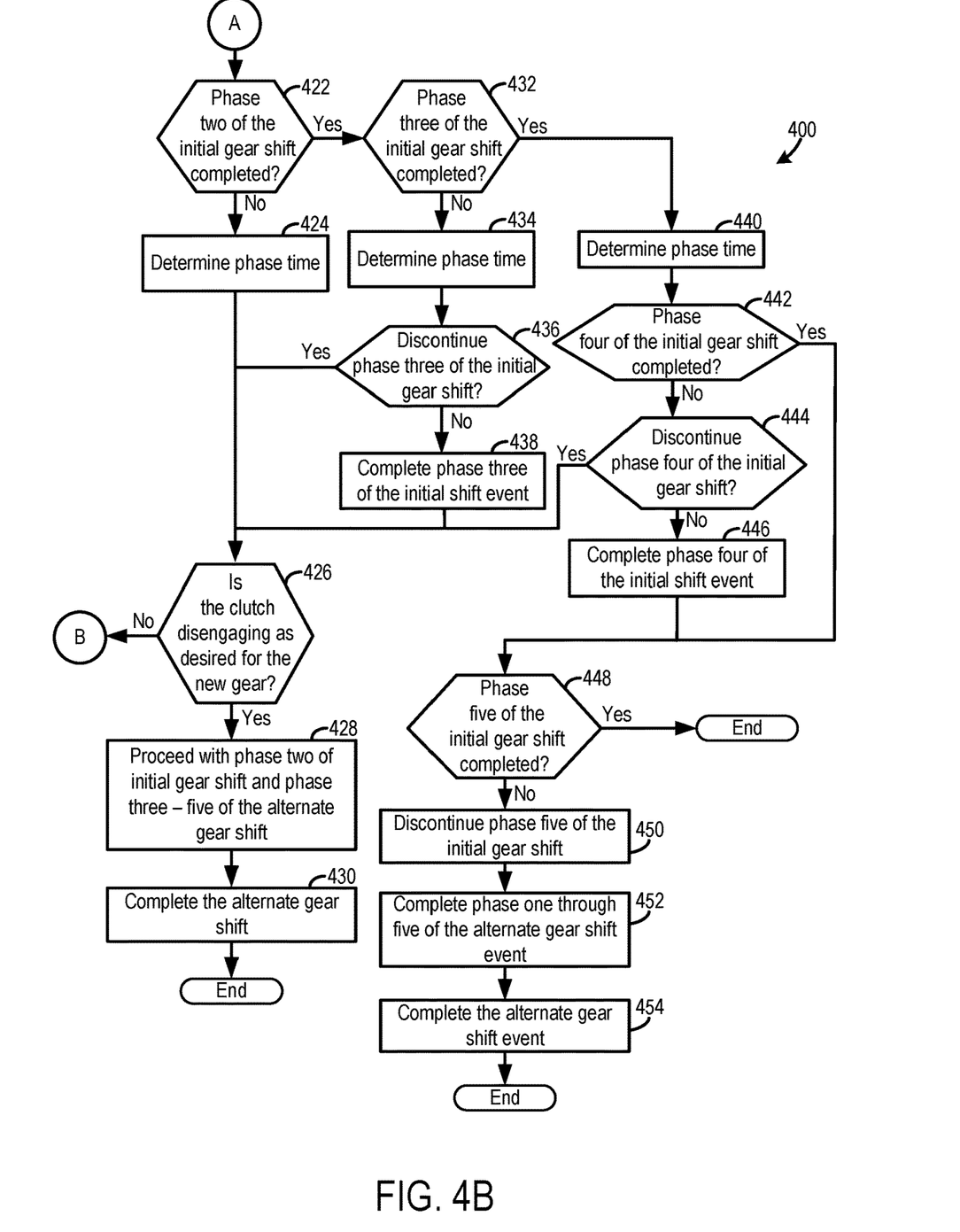
Figure 4C:
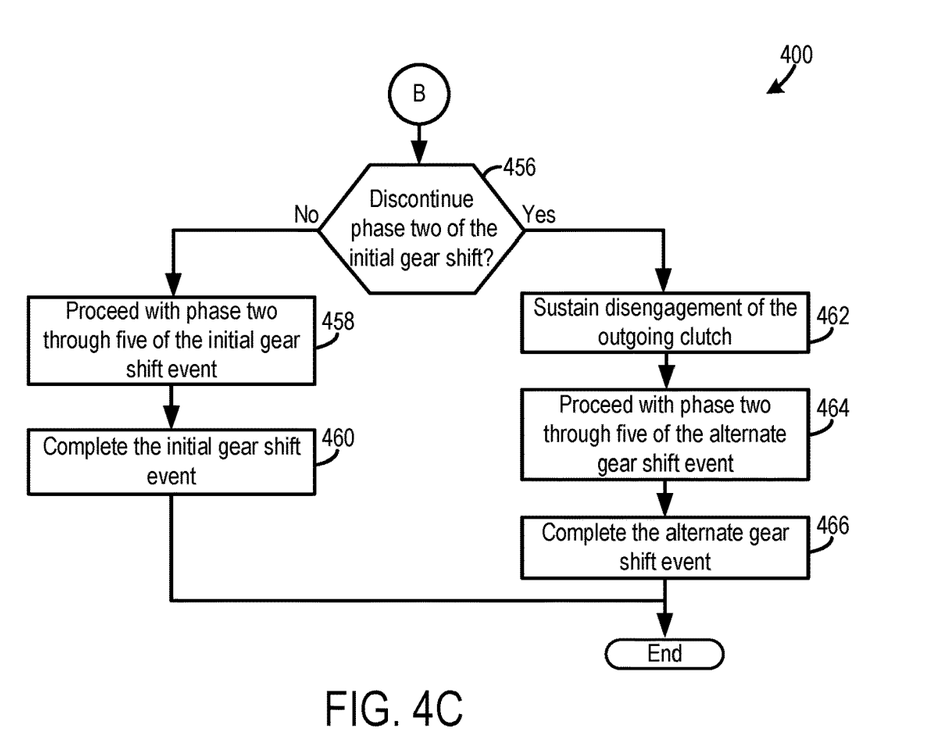

FIGS. 4A-4C show a transmission system control method 400 during a shift change of mind event. As shown in FIG. 4A, at 402, the method includes determining operating conditions which may include steps 404, 406, and 408. Generally, the operating conditions may be determined based on sensor inputs and/or modeling.

At 404, the method includes receiving an alternate gear change request for an alternate gear shift. It will be understood, that the gear change request follows an initial gear change request.

At 406, the method includes determining vehicle, road, and/or environmental conditions. For instance, the vehicle conditions may include the state of charge of a higher voltage traction battery and/or a lower voltage battery used to adjust the transmission clutches. The road conditions may include road grade and/or vehicle position (e.g., GPS coordinates). The environmental conditions may include ambient temperature and/or ambient pressure. At 408, the method includes determining a phase time for each of the phases in the initial gear shift event. Step 402 may further include triggering shift timers for the initial gear shift and the alternate gear shift.

At 410, the method includes determining if the initial gear shift event is in progress. Such a determination may be ascertained if any of the first through the fifth phases of a shift event have not been completed. If it is determined that the initial shift is not in progress (NO at 410) the method moves to 412. At 412, the method includes moving through the phases of the alternate gear shift event. For instance, the first through fifth phases discussed in control scheme 300

(shown in FIG. 3) may be implemented. Next at 414, the method includes completing the alternate shift event. For example, the traction motor may be adjusted based on operator demanded torque while the transmission is sustained in its current operating gear.

On the other hand, if it is determined that the initial shift is in progress (YES at 410) the method moves to 416. At 416, the method includes determining if the first phase of the initial and current gear shift event has been completed. Such a determination may take into account the prime mover torque. For instance, if the prime mover torque is in the process of being decreased to remove gear load, it may be determined that the first phase has not been completed. However, if the prime mover torque has been decreased to a target level to remove gear load, it may be determined that the first phase of the current gear shift event has been completed.

If it is determined that the first phase of the initial gear shift event has been completed (YES at 416) the method moves to step 422 illustrated in FIG. 4B. Conversely, if it is determined that the first phase of the initial gear shift event has not been completed (NO at 416) the method moves to 418 where the method includes completing phase one of the initial gear shift event and following phase two to phase five of the alternate shift event. At 420, the method includes completing the alternate gear shift event. Completion of the alternate gear shift at 420 and elsewhere in method 400 may include resetting the shift timer and following the operator demanded torque.

As shown in FIG. 4B the method 400 includes at 422, determining if the second phase in the initial shift event has been completed. Such, a determination may take into account the position of the outgoing clutch. For instance, it may be determined that the second phase of the initial gear shift has been completed when the outgoing clutch is fully disengaged. On the other hand, it may be determined that the second phase of the initial gear shift has not been completed when the outgoing clutch is partially engaged.

If it is determined that the second phase of the initial gear shift event has not been completed (NO at 422), the method moves to 424 where the method includes determining the phase times for the phases of the alternate gear change event. To elaborate, the phase times for the second through the fifth phases of the alternate gear change event may be determined.

At 426 the method includes determining if the clutch is disengaging in a desired manner for the new gear associated with the alternate gear change event. For instance, the clutch position may be monitored to determine if the clutch disengagement is unfolding as desired. To elaborate, position sensors and/or pressure sensors coupled to the clutches may be used to determine the direction and status of the clutches which aids in confirming if the clutch is disengaging as desired.

If it is determined that the clutch is not disengaging in a desired manner for the new gear (NO at 426) the method moves to 456 shown in FIG. 4C.

Conversely, if it is determined that the clutch is disengaging in a desired manner for the new gear (YES at 426) the method moves to 428 where the method includes proceeding with phase two of the initial gear shift event and with phase three through phase five of the alternate gear shift event. At 430, the method includes completing the alternate gear shift event.

If it is determined that the second phase of the initial gear shift event has been completed (YES at 422), the method moves to 432 where the method includes determining if the third phase of the initial gear shift event has been completed. For instance, the speed of the incoming gear may be monitored to determine if the synchronization of the incoming gear is occurring.

If it is determined that the third phase of the initial gear shift event has not been completed (NO at 432) the method moves to 434 where the method includes determining the phase times for the phases of the alternate gear change event. To elaborate, the phase times for the third through the fifth phases of the alternate gear change event may be determined.

At 436, the method includes determining if phase three of the initial gear change event should be discontinued. Such a determination may compare the phase time associated with discontinuing the third phase of the initial gear shift event and the phase time associated without discontinuing the third phase of the alternate gear shift event. To elaborate, the time corresponding to each of the phases in the different gear shift scenarios may be summed and compared. The gear shift scenario with the shorter time is then selected. For instance, the times of the phases in the gear shift scenario where the third phase is discontinued are summed and the times of the phases in the gear shift scenario where the third phase is not discontinued are summed. Both the times are then compared. A similar technique may be used to determine if the fourth phase of the initial gear shift should be discontinued.

If it is determined that phase three of the initial gear shift event should be discontinued (YES at 436), the method moves to 426. Conversely if it is determined that phase three of the initial gear shift event should not be discontinued (NO at 436), the method moves to 438. At 438, the method includes completing phase three of the initial shift event. For instance, the incoming gear associated with the initial shift event may be synchronized. After 438 the method moves to step 426.

If it is determined that the third phase of the initial shift event has been completed (YES at 432) the method moves to 440 where the method includes determining the phase times for the phases of the alternate gear change event. To elaborate, the phase times for the fourth through the fifth phases of the alternate gear change event may be determined.

At 442, the method includes determining if the fourth phase of the initial gear change event has been completed. For instance, the engagement of the incoming clutch may be monitored to determine if it is completely engaged.

If it is determined that the fourth phase of the initial gear change event has not been completed (NO at 442) the method moves to 444 where the method includes determining if phase four of the initial gear change event should be discontinued. Such a determination may take into account the times associated with completing the alternate gear change event with and without discontinuing the fourth phase of the initial gear change event and selecting the shortest time.

If is it determined that the fourth phase of the initial gear change event should not be discontinued (NO at 444) the method moves to 446 where the method includes completing phase four of the initial shift event. For instance, the incoming clutch associated with the new gear associated with the initial shift event may be completely engaged.

If is it determined that the fourth phase of the initial gear change event should be discontinued (YES at 444) the method moves to 426.

If it is determined that the fourth phase of the initial gear change event has been completed (YES at 442) the method moves to 448. At 448, the method includes determining if the fifth phase of the initial shift event has been completed. To elaborate, the prime mover torque may be monitored to determine if its output torque has returned to an operator demanded torque which may corresponding to accelerator pedal position.

If it is determined that the fifth phase of the initial shift event has been completed (YES at 448) the method ends. On the other hand, if it is determined that the fifth phase of the initial shift event has been completed (NO at 448) the method moves to 450 where the method includes discontinuing the fifth phase of the initial shift event. For instance, the prime mover torque increase may be stopped.

At 452, the method includes completing phase one through phase five of the alternate shift event. For instance, steps 302, 304, 306, 308, and 310, shown in FIG. 3 may be implemented for the alternate shift event. At 454 the method includes completing the alternate shift event.

At 456 shown in FIG. 4C the method includes determining if phase two of the initial gear shift event should be discontinued. This determination may monitor the configuration of the outgoing clutch to ascertain if the outgoing clutch associated with the initial gear shift event is completely disengaged.

If it is determined that phase two of the initial gear shift event should not be discontinued (NO at 456) the method moves to 458 where the method includes proceeding with phase two through phase five of the initial shift event. For instance, steps 304, 306, 308 and 310 shown in FIG. 3 may be implemented for the initial shift event. As shown in FIG. 4C, the method includes at 460, completing the initial shift event.

If it is determined that phase two of the initial gear shift event should be discontinued (YES at 456) the method moves to 462 where the method includes sustaining disengagement of the outgoing clutch associated with the initial gear shift event. At 464, the method includes proceeding with phase two through phase five of the alternate shift event. For instance, steps 304, 306, 308 and 310 shown in FIG. 3 may be implemented for the alternate shift event. At 466, the method includes completing the alternate shift event. Method 400 allows duration of implementing a change of mind shift event to be decreased thereby increasing transmission performance. Further, the phase time calculation may be implemented in real time or near real time, further decreasing the processing duration for implementation of the method. Method 400 further allows the likelihood of component degradation to be decreased and drivability performance to be increased.

Figure 5:
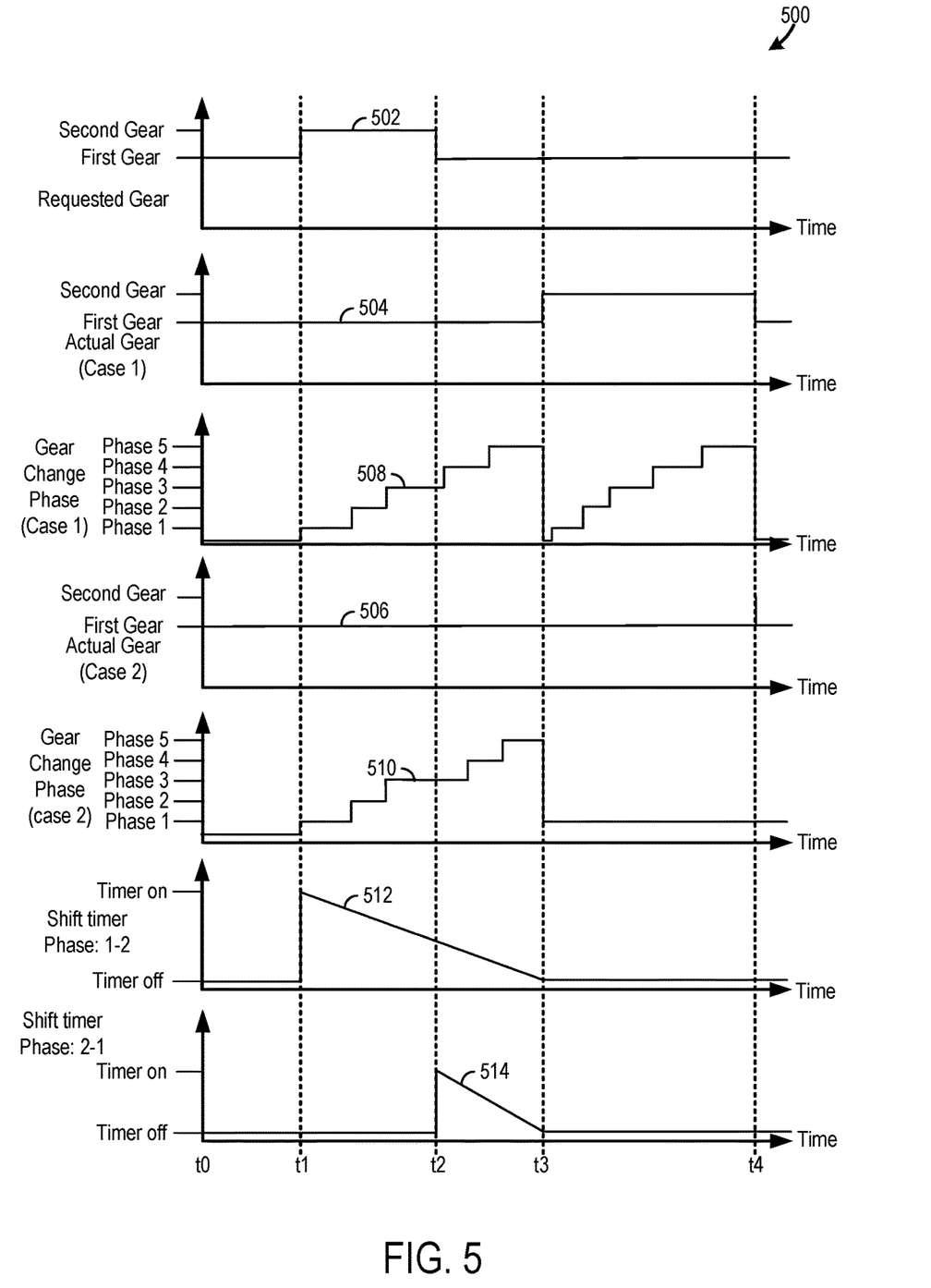
FIG. 5 shows a timing diagram for different use-case change of mind shifting scenarios.

FIG. 5 illustrates a timing diagram 500 of a use-case scenario for a transmission system, such as any of the previously described transmission systems or other suitable systems. In each graph, time is indicated on the abscissa and increases from left to right. The ordinate for plot 502 indicates the requested gear in the transmission. The ordinate for plot 504 indicates the active gear in the transmission for a first case. The ordinate for plot 506 indicates the active gear in the transmission for a second case.

The ordinate for plot 508 indicates the gear change phases for the first case where the initial gear shift is not interrupted and all of the initial gear change phases are implemented and subsequently all of the alternate gear change phases are implemented.

The ordinate for plot 510 indicates the gear change phases for the second case where the initial gear shift is interrupted and three of the gear change phases are implemented for the initial gear shift and two of the gear change phases are implemented for the alternate gear shift.

Plot 512 indicates the calculated time for implementing a shift from the first gear to the second gear which corresponds to the initial gear shift request. Plot 514 indicates the calculated time for implementing a shift from the second gear to the first gear which corresponds to the alternate gear shift requests. The ordinates of plots 512 and 514 indicate a "timer on" and "timer off" value.

At t1 an initial gear shift request from the first gear to the second gear is received. At t2, an alternate gear shift request from the second gear to the first gear is received.

For the first case, phases one through five of the initial gear shift are implemented and at t3 the transmission is in the second gear. Next, phases one through five of the alternate gear shift are implemented and at t4 the transmission is back in the first gear.

For the second case, phases one through three of the initial gear shift are implemented. However, at phase three, the initial gear shift is interrupted. As shown, the shift timer for interruption the initial gear shift is shorter than implementing all of the phases in the initial gear shift. As such, the transmission will choose to implement the second scenario to decrease the shift duration and torque interruptions, consequently.

The technical effect of the transmission system operating methods described herein is to decrease the shift duration during a change of mind event to increase transmission performance and reduce torque interruptions during shifting transients.

FIG. 1 shows example component configurations with relative positioning of the various components. If elements are shown directly contacting each other, or directly coupled to one another, then such elements may be referred to as directly contacting or directly coupled to one another, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, a method for operation of a transmission system is provided that comprises re-estimating a time for each phase of an alternate gear shift in response to determining one or more conditions that are indicative of an operator's intent to implement the alternate gear shift; and performing one or more gear change phases that reduce a duration to implement the alternate gear shift based on the re-estimated time for each phase of the alternate gear shift. In one example, the time for each phase may be re-estimated based on a state of charge of a lower voltage energy storage device. Further, in one example, the lower voltage energy storage device may be electrically coupled to multiple clutch actuators. Further, in one example, the time for each phase may be re-estimated based on a state of charge of a higher voltage battery. Further, in one example, the higher voltage battery may be electrically coupled to a traction motor. Further, in one example, the time for each phase may be re-estimated based on one or more environmental conditions and/or vehicle operating conditions.

Further, in one example, the one or more environmental conditions may include one or more of ambient temperature, ambient pressure, and road grade. Further, in one example, the time for each phase may be re-estimated based on vehicle location data. Further, in one example, the time for each phase may be re-estimated based on a traction torque or regeneration torque value. Further, in one example, the transmission system is an automatic transmission.

In another aspect, a transmission system is provided that comprises multiple clutches configured to shift between discrete gears; a controller including instructions that when executed cause the controller to: re-estimate a time for each phase of an alternate gear shift in response to determining one or more conditions that are indicative of an operator's intent to implement an alternate gear shift; and perform one or more gear change phases that reduce a duration to implement the alternate gear shift. Further, in one example, the time for each phase may be re-estimated based on a voltage of a lower voltage energy storage device; the lower voltage energy storage device may be electrically coupled to multiple clutch actuators; the time for each phase may be re-estimated based on a state of charge of a higher voltage battery; and the higher voltage battery may be electrically coupled to a traction motor. Further, in one example, the time for each phase may be re-estimated based on one or more environmental conditions; the one or more environmental conditions may include one or more of ambient temperature, ambient pressure, and road grade; the time for each phase may be re-estimated based on vehicle location data. Further, in one example, the transmission system may be rotationally coupled to a traction motor. Further, in one example, the transmission system may be a step shift transmission system.

In yet another aspect, a method for operation of a transmission system in an electric powertrain is provided that comprises estimating a time for each phase of an initial gear shift in response to determining one or more conditions that are indicative of an operator's intent to implement the initial gear shift; re-estimating a time for each phase of an alternate gear shift in response to determining one or more conditions that are indicative of an operator's intent to implement an alternate gear shift; and performing one or more gear change phases that reduce a duration to implement the alternate gear shift based on a comparison between the estimated time and the re-estimated time. Further, in one example, the time for each phase may be re-estimated based on a voltage of a lower voltage energy storage device; the lower voltage energy storage device may be electrically coupled to multiple clutch actuators; wherein the time for each phase may be re-estimated based on a state of charge of a higher voltage battery; and wherein the higher voltage battery may be electrically coupled to a traction motor. Further, in one example, the transmission system may be included in an electric vehicle. Further, in one example, the time for each phase may be re-estimated based on one or more environmental conditions; the one or more environmental conditions may include one or more of ambient temperature, ambient pressure, and road grade; the time for each phase may be re-estimated based on vehicle location data; and the time for each phase may be re-estimated based on a traction torque or regeneration torque value. Further, in one example, performing one or more gear change phases may include a phase where a first friction clutch is disengaged and a phase where a second friction clutch is disengaged.

Note that the example control and estimation routines included herein can be used with various transmission configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines in some instances, transmissions, and the like. The subject matter of the present disclosure includes all novel and non-obvious combinations and sub-combinations of the various systems and configurations, and other features, functions, and/or properties disclosed herein. Further, components that are The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a transmission system, comprising:
   re-estimating a time for each phase of an alternate gear shift in response to determining one or more conditions that are indicative of an operator's intent to implement the alternate gear shift; and
   performing one or more gear change phases that reduce a duration to implement the alternate gear shift based on the re-estimated time for each phase of the alternate gear shift.

2. The method of claim 1, wherein the time for each phase is re-estimated based on a state of charge of a lower voltage energy storage device.

3. The method of claim 2, wherein the lower voltage energy storage device is electrically coupled to multiple clutch actuators.

4. The method of claim 1, wherein the time for each phase is re-estimated based on a state of charge of a higher voltage battery.

5. The method of claim 4, wherein the higher voltage battery is electrically coupled to a traction motor.

6. The method of claim 1, wherein the time for each phase is re-estimated based on one or more environmental and/or vehicle operating conditions.

7. The method of claim 6, wherein the one or more environmental conditions include one or more of ambient temperature, ambient pressure, and road grade.

8. The method of claim 1, wherein the time for each phase is re-estimated based on vehicle location data.

9. The method of claim 1, wherein the time for each phase is re-estimated based on available regeneration and traction torque.

10. The method of claim 1, wherein the transmission system is an automatic transmission.

11. A transmission system, comprising:
    multiple clutches configured to shift between discrete gears;
    a controller including instructions that when executed cause the controller to:
      re-estimate a time for each phase of an alternate gear shift in response to determining one or more conditions that are indicative of an operator's intent to implement the alternate gear shift; and
      perform one or more gear change phases that reduce a duration to implement the alternate gear shift.

12. The transmission system of claim 11, wherein:
    the time for each phase is re-estimated based on a voltage of a lower voltage energy storage device;
    the lower voltage energy storage device is electrically coupled to multiple clutch actuators;
    the time for each phase is re-estimated based on a state of charge of a higher voltage battery; and
    the higher voltage battery is electrically coupled to a traction motor.

13. The transmission system of claim 11, wherein:
    the time for each phase is re-estimated based on one or more environmental conditions and/or vehicle operating conditions;
    the one or more environmental conditions include one or more of ambient temperature, ambient pressure, and road grade; and
    the time for each phase is re-estimated based on vehicle location data.

14. The transmission system of claim 11, wherein the transmission system is rotationally coupled to a traction motor.

15. The transmission system of claim 11, wherein the transmission system is a step shift transmission system.

16. A method for operation of a transmission system in an electric powertrain, comprising:
    estimating a time for each phase of an initial gear shift in response to determining one or more conditions that are indicative of an operator's intent to implement the initial gear shift;
    re-estimating a time for each phase of an alternate gear shift in response to determining one or more conditions that are indicative of an operator's intent to implement the alternate gear shift; and
    performing one or more gear change phases that reduce a duration to implement the alternate gear shift based on a comparison between the estimated time and the re-estimated time.

17. The method of claim 16, wherein:
    the time for each phase is re-estimated based on a voltage of a lower voltage energy storage device;
    the lower voltage energy storage device is electrically coupled to multiple clutch actuators;
    wherein the time for each phase is re-estimated based on a state of charge of a higher voltage battery; and
    wherein the higher voltage battery is electrically coupled to a traction motor.

18. The method of claim 17, wherein the transmission system is included in an electric vehicle.

19. The method of claim 16, wherein:
    the time for each phase is re-estimated based on one or more environmental conditions and/or vehicle operating conditions;
    the one or more environmental conditions include one or more of ambient temperature, ambient pressure, and road grade;
    the time for each phase is re-estimated based on vehicle location data; and
    the time for each phase is re-estimated based on a traction torque or regeneration torque value.

20. The method of claim 16, wherein performing one or more gear change phases includes a phase where a first friction clutch is disengaged and a phase where a second friction clutch is disengaged.

* * * * *